(12) United States Patent
Hornung et al.

(10) Patent No.: US 9,911,215 B1
(45) Date of Patent: Mar. 6, 2018

(54) SYSTEMS AND METHODS FOR PROPAGATING EDITS THROUGH A VIDEO

(71) Applicants: DISNEY ENTERPRISES, INC., Burbank, CA (US); ETH Zürich, Zürich (CH)

(72) Inventors: Alexander Sorkine Hornung, Zürich (CH); Simone Meyer, Zürich (CH)

(73) Assignees: Disney Enterprises, Inc., Burbank, CA (US); ETH Zürich, Zürich (CH)

(*) Notice: Subject to any disclaimer, the term of this patent is extended or adjusted under 35 U.S.C. 154(b) by 0 days.

(21) Appl. No.: 15/343,677

(22) Filed: Nov. 4, 2016

(51) Int. Cl.
| | |
|---|---|
| H04N 5/93 | (2006.01) |
| G06T 11/60 | (2006.01) |
| G11B 27/031 | (2006.01) |
| G06T 7/00 | (2017.01) |
| G06T 7/20 | (2017.01) |

(52) U.S. Cl.
CPC .......... G06T 11/60 (2013.01); G06T 7/0022 (2013.01); G06T 7/20 (2013.01); G11B 27/031 (2013.01); G06T 2207/10016 (2013.01)

(58) Field of Classification Search
CPC ......... G06T 11/60; G06T 7/0022; G06T 7/20; G06T 7/10016
USPC ........ 386/278, 274, 326, 328, 354, 355, 356
See application file for complete search history.

(56) References Cited

U.S. PATENT DOCUMENTS

| | | | |
|---|---|---|---|
| 643,681 A | 2/1900 | Prevet | |
| 5,751,243 A | 5/1998 | Turpin | |
| 6,788,347 B1 | 9/2004 | Kim | |
| 9,571,786 B1 * | 2/2017 | Zimmer | ............... G06T 3/4084 |
| 2002/0087910 A1 | 7/2002 | McEwen | |
| 2009/0279807 A1 | 11/2009 | Kanamorl | |
| 2010/0253820 A1 | 10/2010 | Kanamori | |
| 2013/0144614 A1 | 6/2013 | Myllyla | |

* cited by examiner

*Primary Examiner* — Robert Chevalier
(74) *Attorney, Agent, or Firm* — Sheppard Mullin Richter & Hampton LLP

(57) ABSTRACT

Systems and methods of propagating edits through a video are presented herein. Decompositions of information defining frame images of a video may be obtained. Individual decompositions may include individual sets of sinusoidal functions separated into individual frequency bands. One or more frequency bands that convey differences between an (unedited) frame image and an edited version of that frame image may be identified. A subset of the one or more frequency bands that convey motion information associated with the frame image and a subsequent frame image in the video may be identified. Using the motion information, phase information of individual sinusoidal functions of a decomposition of the edited frame image, which may be included in the subset of the one or more frequency bands, may be propagated based on the motion information.

20 Claims, 3 Drawing Sheets

SYSTEMS AND METHODS FOR PROPAGATING EDITS THROUGH A VIDEO

FIELD OF THE DISCLOSURE

This disclosure relates to propagating edits through a video.

BACKGROUND

Some applications in video processing, e.g., edit propagation, may require explicit correspondence mapping between pixels in consecutive frames. Common approaches may be based on matching sparse feature points, dense optical flow estimations, and/or other techniques. However, finding a pixel-accurate mapping may inherently be an ill-posed problem, and existing dense approaches may require computationally expensive regularization and/or optimization.

SUMMARY

One aspect of the disclosure relates to a system configured to propagate edits through a video. In some implementations, decompositions of information defining frame images of the video may be utilized to propagate one or more edits of one or more frame image to one or more other frame images. Individual decompositions may include individual sets of sinusoidal functions and/or other information. Advantages of using decompositions may eliminate the need for computing accurate pixel correspondences between frames, e.g. extracting sparse features or optical flow. Instead, within the decomposition, image motion may be represented by phase shifts, or phase differences, between sinusoidal functions (and/or other decompositions) within one or more frequency bands of two or more decompositions. Edits to one or more pixels between modified and unmodified images may be conveyed by one or more of amplitude of sinusoidal functions within one or more frequency bands, phase differences between sinusoidal functions within one or more frequency bands, and/or other information. Although the some parts of the disclosure are directed to decompositions including sets of sinusoidal functions, one or more of the features and/or functions of system 100 presented herein may be carried using other types of functions used for decompositions of information defining individual frame images. Once phase differences between unmodified images are determined and/or identified, these phase differences may allow for amplitude information conveyed in decompositions of information defining modified images to be propagated to decompositions of unmodified images.

The system may include one or more physical processors that are configured by machine-readable instructions. Executing the machine-readable instructions may cause the one or more physical processors to facilitate propagating edits through a video. The machine-readable instructions may include one or more of a video component, a decomposition component, an edit identification component, a phase propagation component, an amplitude correction component, a presentation component, and/or other components.

The video component may be configured to obtain information defining one or more videos. The information defining one or more videos may describe spatial domain representations of individual frame images of the given video, and/or other representations. Individual ones of the frame images may be defined by spatial domain representations of the individual frame images and/or other information. Individual frame image may comprise multiple pixels. A spatial domain representation of individual frame image may include information defining pixel information of individual pixels of the frame images, and/or other information. Pixel information may include one or more of a pixel position, a pixel color, a pixel transparency, a pixel size, and/or other information. In some implementations, information defining one or more videos may be provided as, for example, an input signal.

In some implementations, the decomposition component may be configured to obtain decompositions of information defining frame images of a video. Individual decompositions may include individual sets of sinusoidal functions, and/or other information. Individual sinusoidal functions in the individual sets of sinusoidal functions may be separated into individual frequency bands included in a set of frequency bands. Individual sinusoidal functions within an individual frequency band may convey one or more of amplitude information, phase information, frequency information, and/or other information. By way of non-limiting illustration, the decompositions may include one or more of a first decomposition of a first frame image of a video, a second decomposition of an edited version of the first frame image, a third decomposition of a second frame image of the video, and/or other decompositions.

The edit identification component may be configured to identify, based on the first decomposition and the second decomposition, one or more frequency bands that may convey differences between the first frame image and the edited first frame image. Differences may comprise, for example, one or more edits present in the edited first frame image.

The phase propagation component may be configured to identify, from the one or more frequency bands that convey differences between the first frame image and the edited first frame image, a subset of the one or more frequency bands that convey motion information associated with the first frame image and the second frame image. It is noted that the term "motion information" may be used to refer to locations/pixels in images where motion in the images may have happened. However, the motion may be implicitly represented by phases differences, such that actual motion estimation may not be needed.

The phase propagation component may be configured to determine, from sinusoidal functions of the first decomposition and third decomposition that are included in the subset of the one or more frequency bands, motion information. In some implementations, based on an identification of edits (e.g., via edit identification component) and the locations/pixels with reliable phase information (implicit representation of motion), the phase propagation component may further determine locations where there may be missing motion information (e.g., having unreliable phase information) and may facilitate propagation of reliable phase information to locations with unreliable phase information.

The phase propagation component may be configured to propagate phase information of individual sinusoidal functions of the second decomposition that are included in the subset of the one or more frequency bands based on one or more of the motion information determined by phase propagation component, amplitude information, and/or other information. The propagation may include applying a phase shift to individual sinusoidal functions of the second decomposition that are included in the subset of the one or more frequency.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
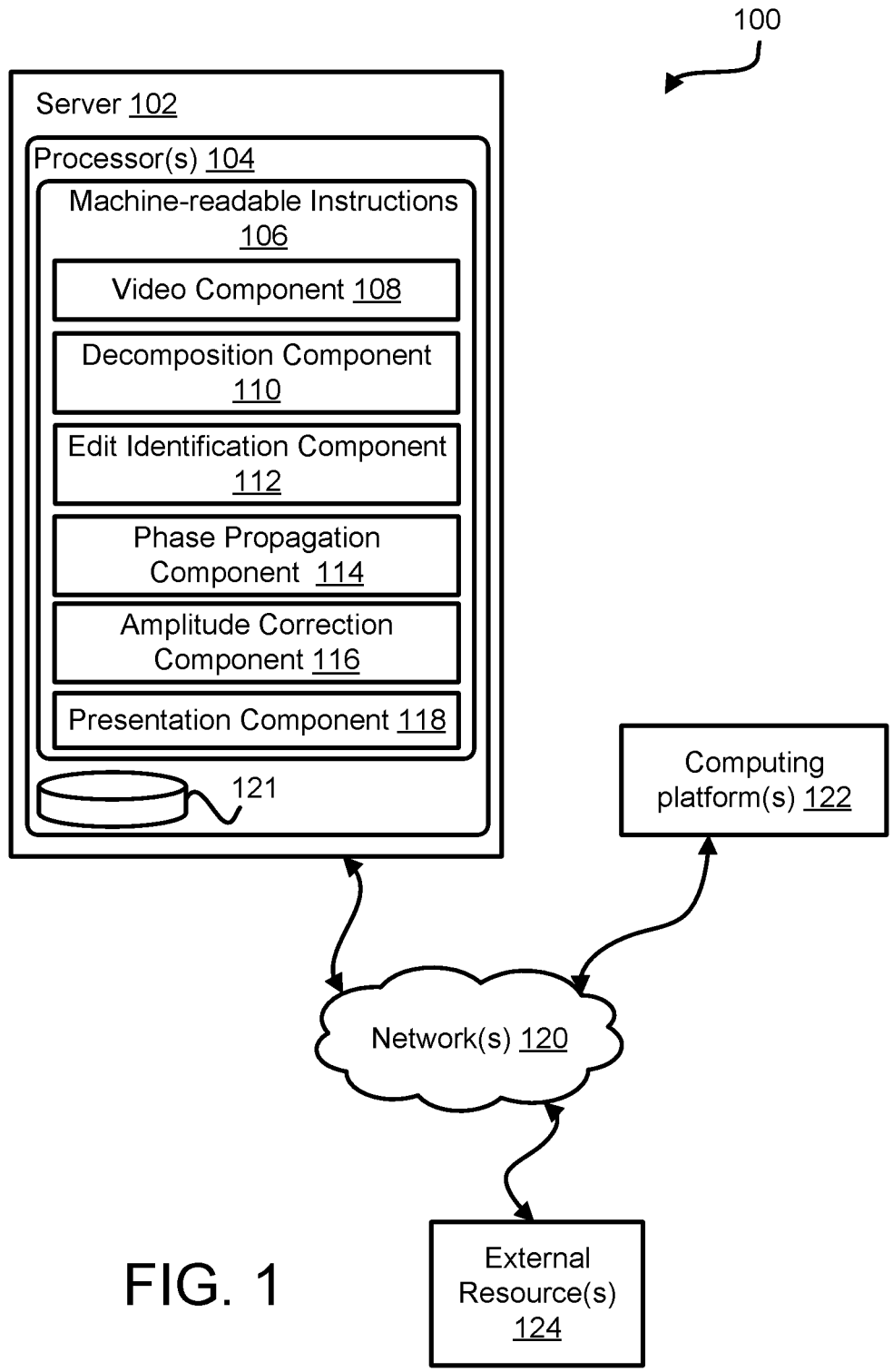
FIG. 1 illustrates a system configured to propagate edits through a video, in accordance with one or more implementations.

FIG. 1 illustrates a system 100 configured to propagate edits through frame images of a video, in accordance with one or more implementations. A video may comprise a series of frame images that may be presented in rapid succession to cause an appearance of movement of object, actors, and/or other elements portrayed in the images. A video may have multiple frame images, a sound track, and/or other components. A video may be a recorded video, a live video feed, and/or other audiovisual asset.

In some implementations, decompositions of information defining frame images may be utilized to propagate one or more edits on a frame image to one or more other frame images. In some implementations, decompositions may include individual sets of sinusoidal functions, and/or other information. Using decompositions may eliminate the need for computing accurate pixel correspondences between frames, e.g. extracting sparse features or optical flow. Instead, within the decomposition, small image motion may be represented by phase shifts or phase differences between sinusoidal functions within one or more frequency bands of two or more decompositions. Edits to one or more pixels may be conveyed by differences in amplitude of sinusoidal functions within one or more frequency bands of decompositions of modified and unmodified images. Once phase differences between unmodified images may be determined and/or identified, these phase differences may allow for amplitude information conveyed in decompositions of information defining modified images to be propagated to decompositions of unmodified images.

Edits to one or more frame images of a video may correspond to one or more of color edits, adding visual content, removing visual content, and/or other edits. By way of non-limiting illustration, a color edit may include one or more of colorization, color filtering, and/or other color edits. Visual content that may be added may include one or more of computer generated graphics (e.g., logos), images, text, and/or other visual content. Visual content that may be removed may include content present in an image and/or other visual content. Visual content present in an image may include one or more of objects, people, background, and/or other visual content of an image.

In some implementations, system 100 may comprise one or more of a server 102, one or more computing platforms 122, and/or other components. The server 102 may include one or more of one or more physical processors 104 configured by machine-readable instructions 106, non-transitory electronic storage media 119, and/or other components. Executing machine-readable instructions 106 may cause one or more physical processors 104 to facilitate propagating edits through frame images of a video. The machine-readable instructions 106 may include one or more of a video component 108, a decomposition component 110, edit identification component 112, a phase propagation component 114, an amplitude correction component 116, a presentation component 118, and/or other components.

In some implementations, server 102 may be configured to provide remote hosting of the features and/or functions of machine-readable instructions 106 to one or more computing platforms 122 that may be remotely located from server 102. In some implementations, one or more features and/or functions of server 102 may be similarly attributed as features and/or functions of individual ones of one or more computing platforms 122. By way of non-limiting example, individual ones of one or more computing platforms 122 may include machine-readable instructions comprising the same or similar components as machine-readable instructions 106.

The one or more computing platforms 122 may include one or more of a cellular telephone, a smartphone, a laptop, a tablet computer, a desktop computer, a television set-top box, smart TV, a gaming console, and/or other computing platform.

In some implementations, video component 108 may be configured to obtain information defining one or more videos. In some implementations, video component 108 may be configured to obtain information defining one or more videos from one or more of one or more computing platforms 122, one or more storage locations (e.g., electronic storage 121, an external resource 124, and/or other storage locations), and/or from other sources of information associated with one or more videos.

In some implementations, information defining one or more videos may describe spatial domain representations of individual frame images of the given video, and/or other representations. Individual ones of the frame images may be defined by spatial domain representations of the individual frame images and/or other information. Individual frame image may comprise multiple pixels. A spatial domain representation of individual frame image may include information defining pixel information of individual pixels of the frame images, and/or other information. Pixel information may include one or more of pixel position, pixel color, pixel transparency, pixel size, and/or other information. By way of non-limiting example, a spatial domain representation may include pixel color information conveying color values within a color space. A color space may include one or more of an RGB color space, Lab color space representation, and/or color space representations. In some implementations, information defining one or more videos may be provided as, for example, an input signal.

In some implementations, decomposition component 112 may be configured to obtain decompositions of information defining frame images of one or more videos. In some implementations, a decomposition of information defining a frame image may be determined based on a transform of the information defining the frame image (e.g., an input signal), and/or based on other techniques. A transform may comprise one or more of a Fourier transform, a wavelet transform, a multi-orientation multi-scale image decomposition, and/or other techniques. In some implementations, a multi-orientation multi-scale image decomposition of information defining a frame image may be achieved by applying a complex-valued steerable pyramid filter to the information defining the frame image (e.g., an input signal), referred to as a "pyramid decomposition." In some implementations, individual decompositions of information defining individual frame images may include one or more of individual sets sinusoidal functions, individual sets of oscillatory functions, and/or other information. In some implementations, individual sinusoidal functions may be represented as discrete wavelets, and/or other representations. Although the some parts of the disclosure are directed to decompositions including sets of sinusoidal functions, one or more of the features and/or functions of system 100 presented herein may be carried using other types of functions used for decompositions of information defining individual frame images.

In some implementations, individual decompositions of information defining individual frame images may include individual sets of sinusoidal functions. Individual sinusoidal functions in the individual sets of sinusoidal function may be separated into individual frequency bands according to one or more of frequency, spatial orientation, and/or other aspects of the individual sinusoidal functions. Obtaining sets of sinusoidal functions separated into individual frequency bands may be accomplished using a complex-valued steerable pyramid filter, and/or other techniques. In some implementations, frequency content which may not have been captured in the frequency bands may be summarized in (real valued) high- and/or low-pass residuals. Individual frequency bands may be referred to as individual "levels" or "pyramid levels" of a pyramid decomposition of information defining a video.

Individual sinusoidal functions within individual frequency bands may convey one or more of amplitude information, phase information, frequency information, and/or other information. Amplitude information may include individual amplitude of individual sinusoidal functions, and/or other information. Phase information may include phase of individual sinusoidal functions. Frequency information may include frequency of individual sinusoidal functions, and/or other information.

By way of non-limiting illustration, a first video may include one or more of a first frame image, an edited version of the first frame image, a second frame image, and/or other frame images. The edited version of the first frame image may comprise the first image having at least one edit. The second frame image may be a frame image that occurs consecutively after the first frame image in the video. The decomposition component 110 may be configured to obtain one or more of a first decomposition of the first frame image, a second decomposition of the edited version of the first frame image, a third decomposition of the second frame image, and/or other decompositions of other frame images. One or more of the first decomposition, second decomposition, third decomposition, and/or other decomposition may be obtained by applying a steerable pyramid filter to inputs signals comprising information defining individual ones of the corresponding frame images. Individual ones of the decompositions may include sets of sinusoidal functions separated into individual frequency bands in a set of frequency bands (also referred to as "pyramid levels").

Figure 2:
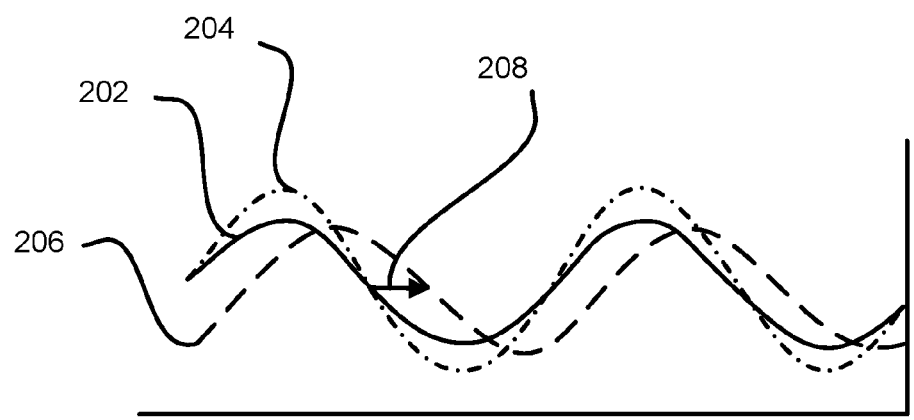
FIG. 2 illustrates a simplified graphical representation of one or more features and/or functions of a system configured to propagate edits through a video.

FIG. 2 illustrates an exemplary graphic of propagating phase information using simple sinusoids. FIG. 2 includes a plot showing a set of sinusoidal functions. The sinusoidal functions may include one or more of a first function 202 (solid line), a second function 204 (dash-dot line), a third function 206 (dashed line), and/or other functions. The second function 204 may be a modified version of the first function 206. For example, second function 204 may have the same or similar phase but a larger amplitude than first function 202. Third function 206 may have the same or similar amplitude as first function 202 but may be phase shifted by a first shift amount 208. In a simplistic view, first function 202 may represent a decomposition of an unedited first frame image of a video, second function 204 may represent a decomposition of an edited version of first frame image, and third function 206 may represent a decomposition of an unedited second frame image of the video that follows the first frame image.

Figure 3:
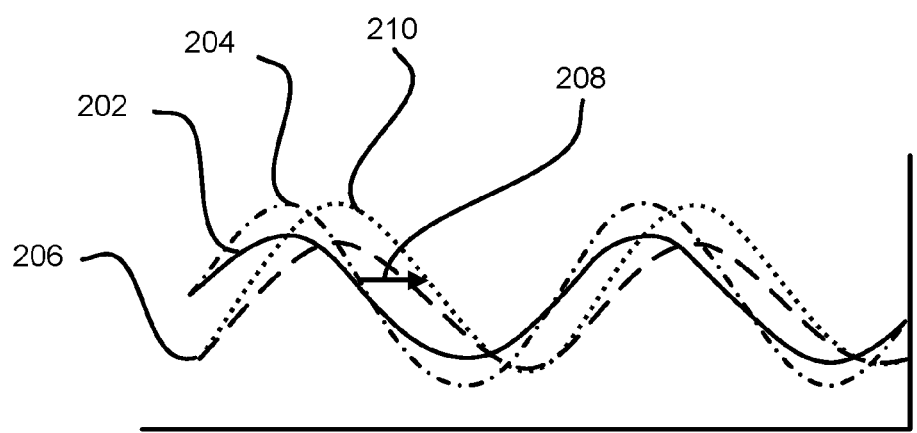
FIG. 3 illustrates a simplified graphical representation of one or more features and/or functions of a system configured to propagate edits through a video.

FIG. 3 illustrates another exemplary graphic of propagating phase information using simple sinusoids. FIG. 3 includes a plot showing the first function 202 (solid line), the second function 204 (dash-dot line), the third function 206 (dashed line), and a fourth function 210 (dotted line). Fourth function 210 may represent a phase shift of the second function 204 by the first shift amount 208. Fourth function 210 may represent a propagation of phase information of second function 204 to third function 206. For example, in simplistic terms, the fourth function 210 may represent a decomposition of an edited version of the second frame image.

Returning to FIG. 1, edit identification component 112 may be configured to identify one or more frequency bands that may convey differences between frame images and edited versions of the frame images. In some implementations, differences between frame images and edited version of the frame images may be found in amplitude information. By looking into amplitude information in the decompositions of frame images and edited versions of the frame images, occurrences of large differences in amplitude between sinusoidal functions in the same frequency band may be used to identify where edits may be present in the edited frame image. In other words, one or more frequency bands in decompositions of edited versions of frame images having amplitude information that may differ from amplitude information in the corresponding bands of the decompositions of the original (e.g., unedited) frame images more than a threshold may be identified as conveying differences between frame images and edited versions of the frame images. In some implementations, the data may be normalized and the threshold may be determined experimentally. In some implementations, due to the normalization, the same or similar threshold may be used for one or more experiments. In some implementations, the threshold may comprise the value of "3," and/or other values.

In some implementations, identifying one or more frequency bands that may convey differences between frame images and edited versions of the frame images may comprise determining differences in amplitude information in decompositions of frame images and decompositions of edited versions of the frame images. In some implementations, one or more frequency bands that may be determined to convey differences between frame image and edited versions of the frame images may include one or more frequency bands having differences in amplitude information above one or more thresholds.

In some implementations, amplitude information may be normalized. Amplitudes of sinusoidal functions included in amplitude information of individual frequency bands may be normalized to be scale-independent. By way of non-limiting illustration, applying a pyramid filter may downsample an image. The amplitudes may be rescaled by a scaling factor of a pyramid filter and/or other information.

In some implementations, differences in amplitude information may comprise one or more of absolute differences, normalized differences, and/or other differences. In some implementations, amplitude differences may be normalized with respect to one or more of an amplitude sample mean, an amplitude sample standard deviation, and/or other information.

By way of non-limiting illustration, edit identification component 112 may be configured to identify, based on the first decomposition, the second decomposition, and/or other decompositions, one or more frequency bands that convey differences between the first frame image and the edited first frame image. Identifying the one or more frequency bands that convey differences between the first frame image and the edited first frame image based on the first decomposition and the second decomposition may comprise determining that differences in amplitude information included in the one or more frequency bands of the first decomposition and the second decomposition may be greater than a first threshold and/or other thresholds.

In some implementations, phase propagation component 114 may be configured to identify individual subsets of the one or more frequency bands identified by edit identification component 112 that may convey motion information between individual pairs of unedited frame images. Reliable motion information determination may require reliable phase information (i.e., reliable phase differences) associated with a pair of unmodified input images. In some implementations, reliable phase information may, in turn, depend on relative strength of the respective amplitudes compared to other pyramid levels. Identifying the subset of the one or more frequency bands may comprise analysis of amplitude information of frequency bands of decompositions of unedited image pairs. In some implementations, relative strength of amplitudes may be determined by comparing minimum amplitudes within individual frequency bands against one or more thresholds. For example, using normalized amplitudes, if minimum amplitudes of sinusoidal functions in one or more frequency bands of the decompositions of the pair of unedited consecutive frame images are greater than a threshold, than it may be determined that the one or more frequency bands convey significant motion information between the pair of unedited consecutive frame images. In some implementations, the threshold may comprise the value of "3," and/or other values.

In some implementations, phase propagation information 114 may be configured to determine motion information included in an identified subset of one or more frequency bands. In some implementations, motion information may be determined from phase information of sinusoidal functions included in the subset of the one or more frequency bands of decompositions of a pair of frame images. In some implementations, determining motion information may comprise determining phase differences between sinusoidal functions and/or other techniques.

By way of non-limiting illustration, considering again the first decomposition of first frame image, the second decomposition of the edited first frame image, and the third decomposition of the second frame image, phase propagation component 114 may be configured to identify, from one or more frequency bands that convey differences between the first frame image and the edited first frame image (e.g., as determined by edit identification component 112), a subset of the one or more frequency bands that convey motion information associated with the unedited first frame image and the second frame image. The phase propagation component 114 may be configured such that identifying the subset may comprise determining that amplitude information in the subset of the one or more frequency bands in the first decomposition and the third decomposition may be greater than a threshold.

In some implementations, phase propagation component 114 may be configured to identify individual second subsets of one or more frequency bands identified by edit identification component 112 that may not convey motion information between individual pairs of unedited frame images. For example, individual second subsets may comprise one or more frequency bands identified by edit identification component 112 but not included in individual subsets of the one or more frequency bands that do convey motion information. By way of non-limiting illustration, individual second subsets of the one or more frequency bands may be where there may be significant change in amplitude information between a frame image and an edited version of the frame image (e.g., corresponding to edits) but no reliable motion information.

For the identified individual second subsets of the one or more frequency bands, phase propagation component 114 may be configured to determine estimated motion information. In some implementations, estimated motion information may be determined from motion information derived from one or more other frequency bands not included in the second subsets that may have motion information. For example, motion information may be determined from one or more frequency bands that may be at a lower pyramid level than the one or more frequency bands in the second subsets. Motion information at the one or more lower frequency bands (e.g., phase differences) may then be propagated up to the one or more frequency bands included in the individual second subsets. By way of non-limiting illustration, due to the fact that a complex steerable pyramid decomposition may be translation-invariant, it may be assumed that the frequency bands may move in a similar way. To propagate a phase difference from a lower level frequency band to a higher frequency band in order to determined estimated motion information for the higher frequency band, a phase difference determined at the lower level frequency band may be multiplied by a scale factor of the pyramid filter.

By way of non-limiting illustration, phase propagation component 114 may be configured to identify a second subset of the one or more frequency bands that convey differences between the first frame image and the edited first frame image but do not convey motion information associated with the first image and the second image. The second subset of the one or more frequency bands may include one or more frequency bands not included in the subset of the one or more frequency bands. The phase propagation component 114 may be configured to determine estimated motion information associated with the second subset of the one or more frequency bands. Determining estimated motion information may comprise determining motion information (e.g., phase difference) in one or more lower frequency bands and propagating the motion information in the one or more lower frequency bands to individual ones of the frequency bands in the second subset of the one or more frequency bands.

In some implementations, phase propagation component 114 may be configured to propagate phase information of individual sinusoidal functions of one or more decompositions of edited frame images based on determined and/or estimated motion information, and/or other information. In some implementations, propagating phase information may comprise applying phase shifts to the decompositions of edited frame images based on determined and/or estimated motion information, and/or other information.

In some implementations, propagating phase information of individual sinusoidal functions of one or more decompositions of edited frame images may generate one or more new decompositions of edited versions of otherwise unedited frame images. For example, edits conveyed in the decompositions of edited frame images may be propagated based on phase differences conveyed by motion information to generate new decompositions that include the propagated information. The propagation may be in accordance with motion information associated with the original (e.g., unedited) decompositions of the consecutive unedited frame image(s), and/or other information.

By way of non-limiting illustration, considering again the first decomposition of first frame image, the second decomposition of the edited first frame image, the third decomposition of the second frame image, the subset of the one or more frequency bands that convey motion information associated with the first frame image and the second frame image, and determined motion information associated with the first frame image and the second frame image, phase propagation component 114 may be configured to propagate phase information of individual sinusoidal functions of the second decomposition that may be included in the subset of the one or more frequency bands based on motion information associated with the first frame image and the second frame image. In some implementations, propagating the phase information may define a fourth decomposition of information defining an edited version of the second frame image. The propagation may be accomplished by applying a phase shift to individual sinusoidal functions of the second decomposition that may be included in the subset of the one or more frequency bands.

By way of non-limiting illustration, considering further the estimated motion information determined from the second subset comprising one or more frequency bands that do not convey reliable motion information associated with the first image and the second image, phase propagation component 114 may be configured to propagate phase information of individual sinusoidal functions of the second decomposition that may be included in the second subset of the one or more frequency bands to individual sinusoidal functions of the fourth decomposition that may also be included in the second subset of the one or more frequency bands. The propagation may include a phase shift determined based on the estimated motion information and/or other information.

The video component 108 may be configured to determine information defining one or more edited frame images of a video to facilitate presenting the video at one or more computing platforms 122. In some implementations, information that may define edited versions of frame images may be determined from decompositions of the frame images that may include information propagated from a preceding frame image. In some implementations, determining the information may be based on performing an inverse transform on the decompositions of the information in order to obtain the information in a format that may be readable to present views of the frame images (e.g., an input signal).

The presentation component 118 may be configured to effectuate presentation of one or more frame images of one or more videos using information determined by video component 108, and/or other information. Presentation may be effectuated at one or more computing platforms 122 associated with one or more users.

It is noted that although the above descriptions illustrates propagation edits from a first frame image and a second frame image, the features and/or functions presented herein may be similarly carried out for other sets of frame images. For example, one or more features and/or functions presented above may be similarly carried out to perform one or more of prorogating edits now present on the second frame image to a subsequent and otherwise unedited third frame image, propagating edits on the third frame image to a subsequent and otherwise unedited fourth frame image, and so on.

Referring back to determining estimated motion information, corrections due to use of the estimation may be made. For example, there may diminishing response in the amplitude, which may manifest in frame images as increasing blur. One reason may be the propagation of phase information from pyramid levels with lower resolution (e.g., to determine the estimated motion information), which may result in a loss of sharpness of details. In some implementations, it may be assumed that motion information may be captured in the phase, and the amplitude may remain the same. This may be mainly visible at high frequency details such as edges. To avoid a computation of explicit correspondences which may allow to move the amplitude, amplitude correction component 116 may perform one or more of the following operations.

In some implementations, amplitude correction component 116 may be configured to decompose again the information defining edited versions of frame images (which already have phase information propagated). Amplitude correction component 116 may be configured to compare the new decomposition of the edited frame images with decompositions of original (e.g., unedited) version of the same frame images to detect how much the amplitudes have changed due to the phase information propagation. The idea may be to increase the amplitude of sinusoidal functions in the new decompositions of the modified frame images where necessary. At locations where the amplitudes in the new decompositions are large, it may not be as large as it should be and may be increased further. In particular, amplitude of one or more sinusoidal functions of a new decomposition may be increased proportionally to the amplitude differences between decompositions of modified and unmodified versions of previous frame images.

By way of non-limiting illustration, amplitude correction component 116 may be configured to determine information defining the edited version of the second frame image from the fourth decomposition of the information defining the edited version of the second frame image. The amplitude correction component 116 may be configured to determine a fifth decomposition of the information defining the edited version of the second frame image. Due to the nature of a pyramid filter, the fifth decomposition may be different from the fourth decomposition. The amplitude correction component 116 may be configured to compare the fifth decomposition with the third decomposition to determine differences in amplitude information included in the second subset of the one or more frequency bands. In particular, amplitude correction component 116 may detect how much the amplitudes have changed due to the edit propagation. For one or more frequency bands in the second subset of frequency bands that include amplitude information in the fifth decomposition that may be larger amplitude information in the third decomposition, amplitude correction component 116 may be configured to increase the amplitudes of one or more sinusoidal functions in the corresponding ones of the one or more frequency bands in the second subset of frequency bands in the fifth decomposition. In some implementations, the increase in amplitude of one or more sinusoidal functions of the fifth decomposition may be based on the amplitude differences between the first decomposition and second decomposition. For example, the amplitudes in the fifth decomposition may be increased such that that the amplitude differences between the third and fifth decomposition are proportional to the amplitude differences between the first and second decomposition in one or more frequency bands.

In FIG. 1, the server 102, computing platform(s) 122, and/or external resources 124 may be operatively linked via one or more electronic communication links. For example, such electronic communication links may be established, at least in part, via a network 120 such as the Internet and/or other networks. It will be appreciated that this is not intended to be limiting and that the scope of this disclosure includes implementations in which server 102, computing platform(s) 122, and/or external resources 124 may be operatively linked via some other communication media.

The external resources 124 may include sources of information, hosts, other entities outside of system 100 participating with system 100, and/or other resources. In some implementations, some or all of the functionality attributed herein to external resources 124 may be provided by resources included in system 100.

The server 102 may include electronic storage 121, one or more processors 104, and/or other components. The server 102 may include communication lines or ports to enable the exchange of information with a network and/or other computing platforms. Illustration of server 102 in FIG. 1 is not intended to be limiting. The server 102 may include a plurality of hardware, software, and/or firmware components operating together to provide the functionality attributed herein to server 102. For example, server 102 may be implemented by a cloud of computing platforms operating together as server 102.

Electronic storage 121 may comprise electronic storage media that electronically stores information. The electronic storage media of electronic storage 121 may include one or both of system storage that is provided integrally (i.e., substantially non-removable) with server 102 and/or removable storage that is removably connectable to server 102 via, for example, a port or a drive. A port may include a USB port, a firewire port, and/or other port. A drive may include a disk drive and/or other drive. Electronic storage 121 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 121 may include one or more virtual storage resources (e.g., cloud storage, a virtual private network, and/or other virtual storage resources). Electronic storage 121 may store software algorithms, information determined by processor(s) 104, information received from computing platform(s) 122, and/or other information that enables server 102 to function as described herein.

Processor(s) 104 is configured to provide information-processing capabilities in server 102. As such, processor(s) 104 may include one or more of a digital processor, an analog processor, a digital circuit designed to process information, an analog circuit designed to process information, a state machine, and/or other mechanisms for electronically processing information. Although processor(s) 104 is shown in FIG. 1 as a single entity, this is for illustrative purposes only. In some implementations, processor(s) 104 may include one or more processing units. These processing units may be physically located within the same device, or processor(s) 104 may represent processing functionality of a plurality of devices operating in coordination. The processor 104 may be configured to execute components 108, 110, 112, 114, 116, and/or 118. Processor(s) 104 may be configured to execute components 108, 110, 112, 114, 116, and/or 118 by software; hardware; firmware; some combination of software, hardware, and/or firmware; and/or other mechanisms for configuring processing capabilities on processor(s) 104.

It should be appreciated that although components 108, 110, 112, 114, 116, and/or 118 are illustrated in FIG. 1 as being co-located within a single processing unit, in implementations in which processor(s) 104 includes multiple processing units, one or more of components 108, 110, 112, 114, 116, and/or 118 may be located remotely from the other components. The description of the functionality provided by the different components 108, 110, 112, 114, 116, and/or 118 described above is for illustrative purposes and is not intended to be limiting, as any of components 108, 110, 112, 114, 116, and/or 118 may provide more or less functionality than is described. For example, one or more of components 108, 110, 112, 114, 116, and/or 118 may be eliminated, and some or all of its functionality may be provided by other ones of components 108, 110, 112, 114, 116, 118, and/or other components. As another example, processor 104 may be configured to execute one or more additional components that may perform some or all of the functionality attributed below to one of components 108, 110, 112, 114, 116, and/or 118.

Figure 4:
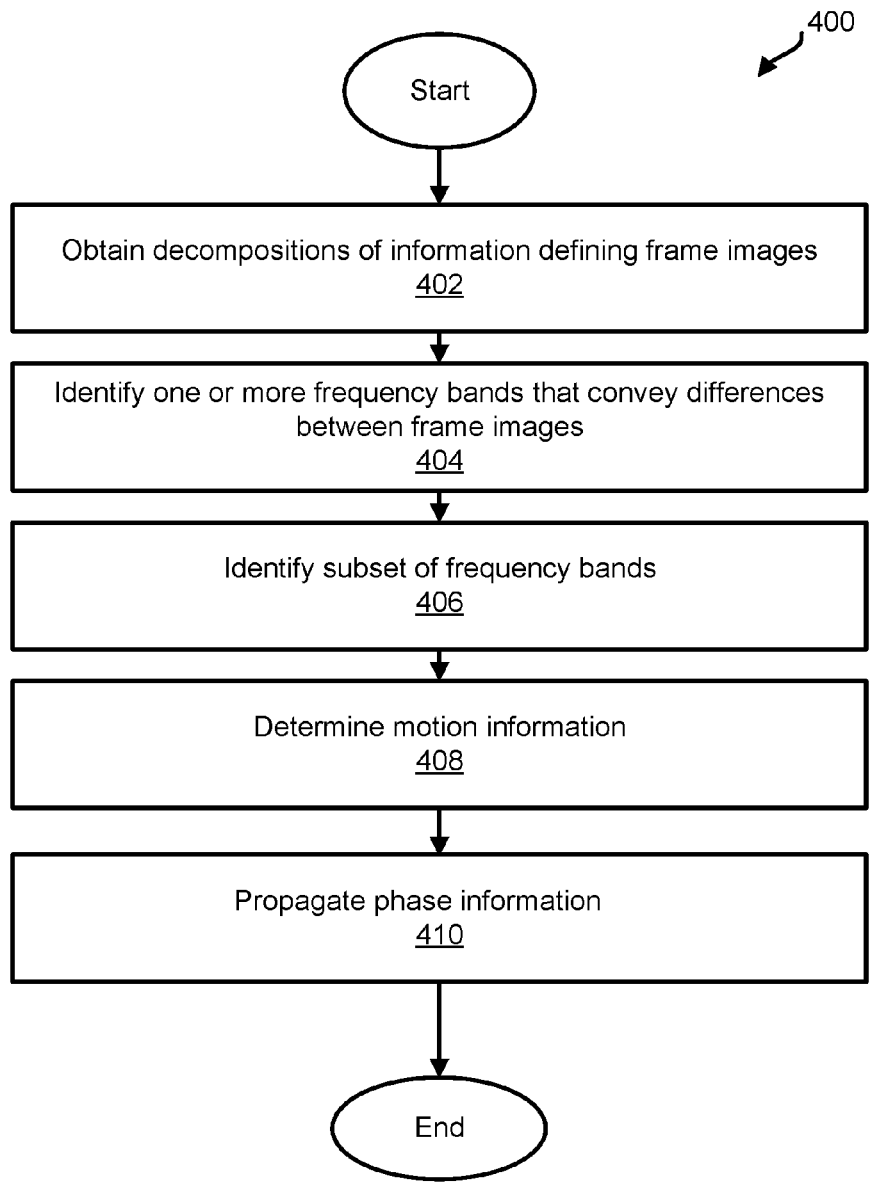
FIG. 4 illustrates a method of propagating edits through a video, in accordance with one or more implementations.

FIG. 4 illustrates a method 400 of propagating edits through a video, in accordance with one or more implementations. The operations of method 400 presented below are intended to be illustrative. In some implementations, method 400 may be accomplished with one or more additional operations not described, and/or without one or more of the operations discussed. Additionally, the order in which the operations of method 400 are illustrated in FIG. 4 and described below is not intended to be limiting.

In some implementations, method 400 may be implemented in a computer system comprising one or more of non-transitory electronic storage storing machine-readable instructions, one or more processing devices (e.g., a physical processor, a digital processor, an analog processor, a digital circuit designed to process information, an analog circuit designed to process information, a state machine, and/or other mechanisms for electronically processing information), and/or other components. The one or more processing devices may include one or more devices executing some or all of the operations of method 400 in response to instructions stored electronically on electronic storage medium. The one or more processing devices may include one or more devices configured through hardware, firmware, and/or software to be specifically designed for execution of one or more of the operations of method 400.

At an operation 402, decompositions of information defining frame images of a video may be obtained. Individual decompositions may include individual sets of sinusoidal functions. Individual sinusoidal functions in individual sets of sinusoidal functions may be separated into individual frequency bands. Individual sinusoidal functions within an individual frequency band may convey one or more of frequency information, amplitude information, phase information, and/or other information. By way of non-limiting illustration, decompositions may include one or more of a first decomposition of a first frame image, a second decomposition of an edited version of the first frame image, a third decomposition of a second frame image, and/or other decompositions. In some implementations, operation 402 may be performed by one or more physical processors executing a decomposition component the same as or similar to decomposition component 110 (shown in FIG. 1 and described herein).

At an operation 404, one or more frequency bands that convey differences between the first frame image and the edited first frame image, and/or between other images, may be identified from the first decomposition, second decomposition, and/or other decompositions. In some implementations, operation 404 may be performed by one or more physical processors executing an edit identification component the same as or similar to edit identification component 112 (shown in FIG. 1 and described herein).

At an operation 406, a subset of the one or more frequency bands that convey motion information associated with the first frame image and the second frame image may be identified from the one or more frequency bands that convey differences between the first frame image and the edited first frame image. In some implementations, operation 406 may be performed by one or more physical processors executing a phase propagation component the same as or similar to phase propagation component 114 (shown in FIG. 1 and described herein).

At an operation 408, motion information may be determined. Motion information may be determined from sinusoidal functions of the first decomposition, third decomposition, and/or other decompositions that may be included in the subset of the one or more frequency bands. In some implementations, operation 408 may be performed by one or more physical processors executing a phase propagation component the same as or similar to phase propagation component 114 (shown in FIG. 1 and described herein).

At an operation 410, phase information may be propagated. By way of non-limiting illustration, phase information of individual sinusoidal functions of the second decomposition and/or other decompositions that may be included in the subset of the one or more frequency bands may be propagated based on determined and/or estimated motion information, and/or other information. In some implementations, operation 410 may be performed by one or more physical processors executing a phase propagation component the same as or similar to phase propagation component 114 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to propagate edits through a video, the system comprising:
    one or more physical processors configured by machine-readable instructions to:
        obtain decompositions of information defining frame images of a video,
    individual decompositions including individual sets of sinusoidal functions, individual sinusoidal functions in the individual sets of sinusoidal functions being separated into individual frequency bands, individual sinusoidal functions within an individual frequency band having amplitude information and phase information, the decompositions including a first decomposition of a first frame image, a second decomposition of an edited version of the first frame image, and a third decomposition of a second frame image;
        identify, from the first decomposition and the second decomposition, one or more frequency bands that convey differences between the first frame image and the edited first frame image;
        identify, from the one or more frequency bands that convey differences between the first frame image and the edited first frame image, a subset of the one or more frequency bands that convey motion information associated with the first frame image and the second frame image;
        determine, from sinusoidal functions of the first decomposition and third decomposition that are included in the subset of the one or more frequency bands, the motion information; and
        propagate phase information of individual sinusoidal functions of the second decomposition that are included in the subset of the one or more frequency bands based on the motion information.

2. The system of claim 1, wherein identifying the one or more frequency bands that convey differences between the first frame image and the edited first frame image based on the first decomposition and the second decomposition comprises:
    determining that differences in amplitude information between the one or more frequency bands of the first decomposition and the second decomposition are greater than a threshold.

3. The system of claim 2, wherein the one or more differences are normalized differences.

4. The system of claim 1, wherein identifying the subset of the one or more frequency bands comprises:
    determining that amplitude information in the subset of the one or more frequency bands in the first decomposition and the third decomposition is greater than a threshold.

5. The system of claim 1, wherein the motion information is determined based on differences between phase information included in the subset of the one or more frequency bands of the first decomposition and third decomposition.

6. The system of claim 1, wherein propagating the phase information of individual sinusoidal functions of the second decomposition that are included in the subset of the one or more frequency bands based on the motion information defines a fourth decomposition of information defining an edited version of the second frame image.

7. The system of claim 6, wherein the one or more physical processors are further configured by machine-readable instructions to:
    identify a second subset of the one or more frequency bands that convey differences between the first frame image and the edited first frame image not included in the subset of the one or more frequency bands, the second subset comprising one or more frequency bands that do not convey motion information associated with the first image and the second image;

for the second subset of the one or more frequency bands, determine estimated motion information; and propagate phase information of individual sinusoidal functions of the second decomposition that are included in the second subset of the one or more frequency bands to individual sinusoidal functions of the fourth decomposition that are also included in the second subset of the one or more frequency bands, the propagation being based on the estimated motion information.

8. The system of claim 7, wherein the estimated motion information is determined from motion information derived from one or more other frequency bands not included in the second subset.

9. The system of claim 7, wherein the one or more physical processors are further configured by machine-readable instructions to:

determine the information defining the edited version of the second frame image from the fourth decomposition of the information defining the edited version of the second frame image;

determine a fifth decomposition of the information defining the edited version of the second frame image, the fifth decomposition being different from the fourth decomposition;

compare the fifth decomposition with the third decomposition to determine differences in amplitude information included in the second subset of the one or more frequency bands, for one or more frequency bands in the second subset of frequency bands that include amplitude information for the fifth decomposition that is larger than amplitude information for the third decomposition in corresponding ones of the one or more frequency bands, increase the amplitudes of one or more sinusoidal functions in the corresponding ones of the one or more frequency bands in the second subset of frequency bands for the fifth decomposition.

10. The system of claim 1, wherein the decompositions are obtained by applying a pyramid filter.

11. A method of propagating edits through a video, the method being implemented in a computer system comprising one or more physical processors and non-transitory electronic storage storing machine-readable instructions, the method comprising:

obtaining decompositions of information defining frame images of a video, individual decompositions including individual sets of sinusoidal functions, individual sinusoidal functions in the individual sets of sinusoidal functions being separated into individual frequency bands, individual sinusoidal functions within an individual frequency band having amplitude information and phase information, including obtaining a first decomposition of a first frame image, a second decomposition of an edited version of the first frame image, and a third decomposition of a second frame image;

identifying, from the first decomposition and the second decomposition, one or more frequency bands that convey differences between the first frame image and the edited first frame image;

identifying, from the one or more frequency bands that convey differences between the first frame image and the edited first frame image, a subset of the one or more frequency bands that convey motion information associated with the first frame image and the second frame image;

determining, from sinusoidal functions of the first decomposition and third decomposition that are included in the subset of the one or more frequency bands, the motion information; and propagating phase information of individual sinusoidal functions of the second decomposition that are included in the subset of the one or more frequency bands based on the motion information.

12. The method of claim 11, wherein identifying the one or more frequency bands that convey differences between the first frame image and the edited first frame image based on the first decomposition and the second decomposition comprises:

determining that differences in amplitude information between the one or more frequency bands of the first decomposition and the second decomposition are greater than a threshold.

13. The method of claim 12, wherein the one or more differences are normalized differences.

14. The method of claim 11, wherein identifying the subset of the one or more frequency bands comprises:

determining that amplitude information in the subset of the one or more frequency bands in the first decomposition and the third decomposition is greater than a threshold.

15. The method of claim 11, wherein the motion information is determined based on differences between phase information included in the subset of the one or more frequency bands of the first decomposition and third decomposition.

16. The method of claim 11, wherein propagating the phase information of individual sinusoidal functions of the second decomposition that are included in the subset of the one or more frequency bands based on the motion information defines a fourth decomposition of information defining an edited version of the second frame image.

17. The method of claim 16, further comprising:

identifying a second subset of the one or more frequency bands that convey differences between the first frame image and the edited first frame image not included in the subset of the one or more frequency bands, the second subset comprising one or more frequency bands that do not convey motion information associated with the first image and the second image;

for the second subset of the one or more frequency bands, determining estimated motion information; and propagating phase information of individual sinusoidal functions of the second decomposition that are included in the second subset of the one or more frequency bands to individual sinusoidal functions of the fourth decomposition that are also included in the second subset of the one or more frequency bands, the propagation being based on the estimated motion information.

18. The method of claim 17, wherein the estimated motion information is determined from motion information derived from one or more other frequency bands not included in the second subset.

19. The method of claim 17, wherein the one or more physical processors are further configured by machine-readable instructions to:

determine the information defining the edited version of the second frame image from the fourth decomposition of the information defining the edited version of the second frame image;

determine a fifth decomposition of the information defining the edited version of the second frame image, the fifth decomposition being different from the fourth decomposition;

compare the fifth decomposition with the third decomposition to determine differences in amplitude information included in the second subset of the one or more frequency bands, for one or more frequency bands in the second subset of frequency bands that include amplitude information for the fifth decomposition that is larger than amplitude information for the third decomposition in corresponding ones of the one or more frequency bands, increase the amplitudes of one or more sinusoidal functions in the corresponding ones of the one or more frequency bands in the second subset of frequency bands for the fifth decomposition.

20. The method of claim 11, wherein the decompositions are obtained by applying a pyramid filter.

* * * * *